UNITED STATES PATENT OFFICE 2,117,283

ORGANIC PHOSPHATES

Shailer L. Bass, Midland, Mich., assignor to The Dow Chemical Company, Midland, Mich., a corporation of Michigan No Drawing. Application August 5, 1935, Serial No. 34,724

15 Claims. (Cl. 260—99.20)

This invention concerns certain new organic phosphates and a method of making the same. Such new phosphates are in most instances water-white liquids which are exceptionally stable against hydrolysis by water, acids, and bases, and against decomposition by heat. They are useful as plasticizers for cellulose esters, cellulose ethers, and synthetic resins, being substantially non-flammable, so that they decrease the flammability of films and plastic masses in which they are incorporated.

In my co-pending application, Serial No. 744,913, filed September 21, 1934, and issued March 17, 1936 as United States Patent 2,033,916, I have described and claimed certain triaryl phosphates having the general formula

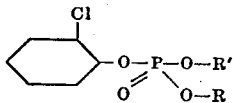

wherein R and R' represent aromatic groups. The present application, which is a continuation-in-part of said co-pending application, deals particularly with mixed triaryl esters of phosphoric acid having the above general formula wherein R' represents a cresyl group and R represents either an orthochlorophenyl or a cresyl group. This invention, then, consists in the new compounds having the formula

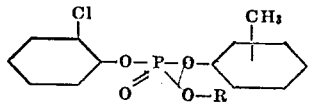

wherein R is a cresyl or an orthochlorophenyl group, together with the method of making the same hereinafter fully described and particularly pointed out in the claims.

The herein described new organic phosphates, having the above general formula, are prepared by reacting a phosphorus oxyhalide successively with orthochlorophenol and a cresol, or alkali metal salts of said phenols. The order in which the different phenolic compounds are reacted is generally not important. For example, a phosphorus oxyhalide may first be reacted with sufficient orthochlorophenol to form an orthochlorophenyl phosphoric acid dihalide or a di-orthochlorophenyl phosphoric acid monohalide, as desired, and the resultant acid halide may thereafter be reacted with one or more of the isomeric cresols to form the desired mixed triaryl phosphate product. Also, the triaryl phosphate may be prepared by reacting orthochlorophenol with a mono- or di-cresyl phosphoric acid halide, e. g., orthocresyl phosphoric acid dichloride, dimetacresyl phosphoric acid bromide, etc.

Each of the reactions just mentioned is carried out by heating a mixture of the reactants to a reaction temperature, preferably in the presence of a catalyst, such as metallic calcium, magnesium, or aluminum, or a chloride of magnesium, aluminum, or iron, etc. The temperature to which the mixture must be heated in order to obtain rapid reaction is, of course, dependent upon the particular reactants employed, the relative proportions of the reactants, the presence or absence of a catalyst, etc. Since, however, the reaction is accompanied by an evolution of hydrogen halide, it is sufficient merely to heat the mixture to a temperature at which hydrogen halide gas is evolved. The reactions are preferably carried out at the lowest convenient reaction temperature, usually below 200° C., since at higher temperatures by-product formation may occur to an objectionable extent.

In preparing a mixed organic phosphate of the present class from a phosphorus oxyhalide and the appropriate phenolic compounds, the intermediate aryl phosphoric acid halide products may be separated as such, e. g., by fractional distillation, prior to carrying out the successive reactions, although it is more convenient, after formation of such intermediate acid halide by reaction of phosphorus oxyhalide and one of the phenols merely to add the desired quantity of the other phenol to the mixture and to continue the reaction to form the triaryl phosphate. The steps involved in separating the intermediate acid halide are thereby eliminated. After the reactions for the formation of the triaryl phosphate are completed, the hot reaction mixture is preferably blown with air to remove hydrogen halide and other volatile impurities and then fractionally distilled to separate the triaryl phosphate product.

The following equations for the successive formation of (1) an orthocresyl phosphoric acid dihalide, and (2) an orthocresyl-di-orthochlorophenyl phosphate illustrate the type of reactions involved in preparing my new mixed triaryl phosphates by the above-described procedure:—

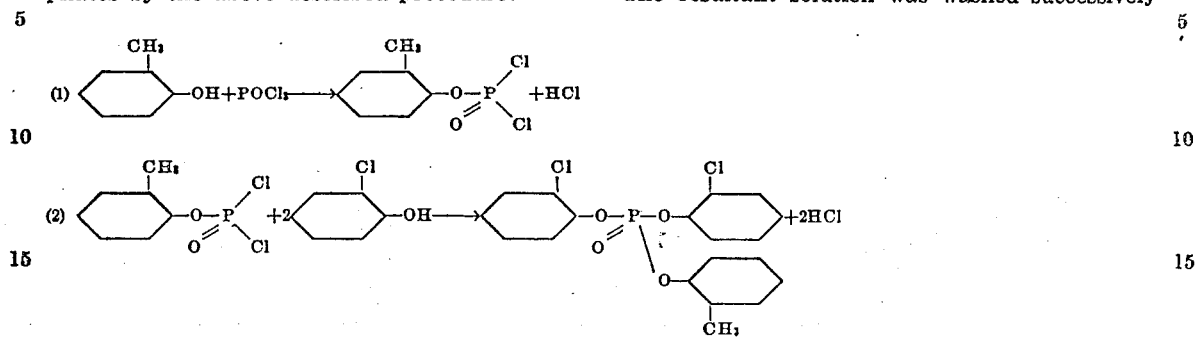

Example 1

A mixture of 432 grams (4.0 mols) of orthocresol and 1227 grams (8.0 mols) of phosphorus oxychloride was heated at approximately 100° C. for about 1 hour, until hydrogen chloride was no longer evolved. Then 1.0 gram (.0105 mol.) of anhydrous magnesium chloride was added and the mixture was heated, with stirring, at 108° C. for an additional 5.3 hours, until the evolution of hydrogen chloride had again ceased. Orthocresyl phosphoric acid dichloride was separated from the reacted mixture by fractional distillation. It was obtained as a practically odorless, water-white, liquid boiling at approximately 135–6° C. under 19 millimeters pressure and having the specific gravity 1.363 at 20°/4° C. 385.5 grams (3.0 mols) of orthochlorophenol, 337.5 grams (1.5 mols) of the orthocresyl phosphoric acid dichloride, and 10 grams (.105 mol.) of magnesium chloride were mixed and heated with stirring at temperatures gradually increasing from 107° to 150° C. for 5.9 hours. Air was bubbled through the reacted mixture to remove dissolved hydrogen chloride and volatile organic impurities, after which it was dissolved in 600 grams of dichlorobenzene. The resultant solution was washed successively with a dilute aqueous hydrochloric acid solution, a dilute aqueous sodium hydroxide solution, and water, and dried over anhydrous calcium chloride. It was then fractionally distilled under vacuum, whereby 493.2 grams (1.2 mols) of substantially pure orthocresyl-di-orthochlorophenyl phosphate was obtained. This product is an odorless, water-white, liquid boiling at 268°–270° C. at 15 millimeters pressure, having a specific gravity of 1.336 at 25°/4° C., the formula being;

Example 2

A mixture of 6 grams (.063 mol.) of magnesium chloride, 122.7 grams (.5 mol.) of orthochlorophenyl phosphoric acid dichloride, and 108.1 grams (1.0 mol.) of orthocresol was heated with stirring at temperatures gradually increasing from 100° to 150° C. for 3.75 hours, at which time the quantity of hydrogen chloride gas evolved indicated that approximately 97.0 per cent of the orthocresol had been reacted. The reacted mixture was blown with air and then dissolved in 200 grams of orthodichlorobenzene. The resultant solution was washed successively with a dilute hydrochloric acid solution, a dilute sodium hydroxide solution, and water, and dried over anhydrous calcium chloride. It was then fractionally distilled under vacuum, whereby 161.2 grams (.41 mol.) of substantially pure di-orthocresyl-orthochlorophenyl phosphate was obtained as a viscous, light yellow, oily liquid, boiling at approximately 272°–273° C. at 7 millimeters pressure and having the specific gravity 1.262 at 25°/4° C. The product has the formula;

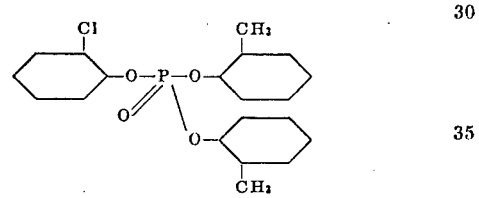

Example 3

A mixture of 368 grams (1.5 mols) of orthochlorophenyl phosphoric acid dichloride, 324 grams (3.0 mols) of metacresol, and 7.1 grams (.0745 mol.) of magnesium chloride was heated with stirring at temperatures gradually increasing from 90° to 100° C. for 1.5 hours. At the end of this time the triaryl phosphate product was then separated as in Example 1. There was obtained 433.0 grams (1.12 mols) of substantially pure di-metacresyl-orthochlorophenyl phosphate as an odorless, water-white liquid boiling at 279°–280° C. at 11–12 millimeters pressure and having the specific gravity 1.252 at 25°/4° C. The product has the formula;

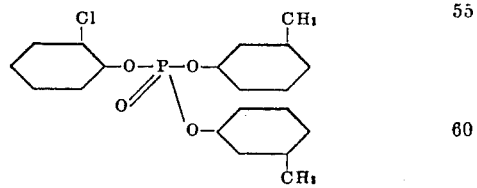

Example 4

A mixture of 368 grams (1.5 mols) of orthochlorophenyl phosphoric acid dichloride, 324 grams (3.0 mols) of paracresol, and 7.1 grams (.0745 mol.) of magnesium chloride was heated with stirring at temperatures gradually increasing from 105° to 135° C. for 2.5 hours. The triaryl phosphate product was separated from the reacted mixture as in Example 1. There was obtained 403 grams (1.08 mols) of di-paracresyl-orthochloro-phenyl phosphate having a boiling point of approximately 282°–284° C. at 9–10 millimeters pressure, a melting point of approximately 41° C., and a specific gravity of 1.227 at 60° C. The product was purified by recrystallization from 90 per cent methyl alcohol, whereby it was obtained in the form of short prismatic crystals melting at 52°-53° C. It has the formula:

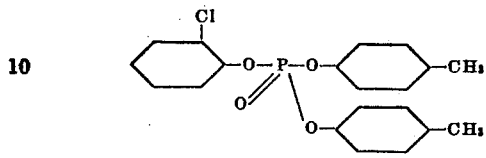

Example 5

A quantity of 324 grams (3.0 mols) of a technical mixture of meta and para cresol, 460.2 grams (3.0 mols) of phosphorus oxychloride, and 5.7 grams (0.06 mol.) of anhydrous magnesium chloride was heated at approximately 70° C. for about 4 hours, i. e. until hydrogen chloride was no longer evolved. 768 grams (6.0 mols) of orthochlorophenol was then added and the reaction completed by heating the mixture with stirring at temperatures gradually increasing from 70° to 150° C. for 6 hours. The triaryl phosphate product was then separated as in Example 1. There was obtained 1050.0 grams (2.55 mols) of isomeric mono-cresyl-di-orthochlorophenyl phosphates as an odorless, water-white liquid boiling at 293°-298° C. at 9 millimeters pressure and having the specific gravity 1.308 at 25°/25° C.

In similar manner phosphorus oxychloride may successively be reacted with:—(1) metacresol, paracresol, and orthochlorophenol to produce metacresyl-paracresyl-orthochloro-phenyl phosphate; (2) orthocresol, paracresol, and orthochlorophenol to produce orthocresyl-paracresyl-orthochlorophenyl phosphate, etc.

Although I prefer to employ phosphorus oxychloride as a reactant in preparing the herein described new organic phosphates, phoshorus oxybromide or phosphorus oxyiodide may be used instead.

Other modes of applying the principle of my invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:—

1. In a method of making a triaryl phosphate having the general formula

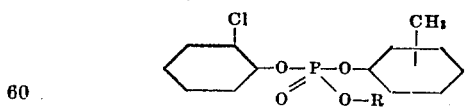

wherein R represents a member of the class consisting of the cresyl and orthochlorophenyl groups, the step which consists in reacting an orthochlorophenyl phosphoric acid halide with a cresol.

2. In a method of making a triaryl phosphate having the general formula

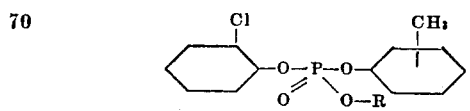

wherein R represents a member of the class consisting of the cresyl and orthochlorophenyl groups, the step which consists in heating an orthochlorophenyl phosphoric acid halide to a reaction temperature with a cresol.

3. In a method of making a triaryl phosphate having the general formula

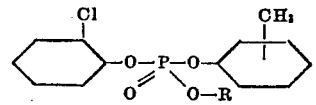

wherein R represents a member of the class consisting of the cresyl and orthochlorophenyl groups, the steps which consist in reacting a phosphorus oxyhalide with a cresol to form a corresponding cresyl phosphoric acid halide, and thereafter reacting the latter with orthochlorophenol.

4. In a method of making a triaryl phosphate having the general formula

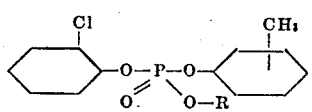

wherein R represents a member of the class consisting of the cresyl and orthochlorophenyl groups, the steps which consist in reacting phosphorus oxychloride with a cresol to form a corresponding cresyl phosphoric acid chloride and thereafter reacting the latter with orthochlorophenol.

5. In a method of making a triaryl phosphate having the general formula

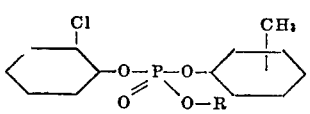

wherein R represents a member of the class consisting of the cresyl and orthochlorophenyl groups, the step which consists in reacting a cresyl phosphoric acid halide with orthochlorophenol.

6. In a method of making a triaryl phosphate having the general formula

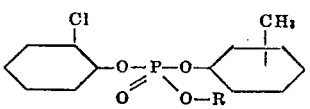

wherein R represents a member of the class consisting of the cresyl and orthochlorophenyl groups, the steps which consist in heating phosphorus oxychloride to a reaction temperature with not more than twice its molecular equivalent of a cresol to form a cresyl phosphoric acid chloride, and heating the latter to a reaction temperature with orthochlorophenol to form the desired mixed triaryl phosphate product.

7. In a method of making a triaryl phosphate having the general formula

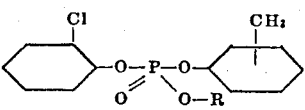

wherein R represents a member of the class consisting of the cresyl and orthochlorophenyl groups, the step which consists in reacting an orthochlorophenyl phosphoric acid halide with a mixture of isomeric cresols.

8. In a method of making a triaryl phosphate having the general formula

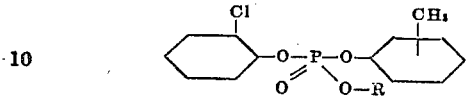

wherein R represents a member of the class consisting of the cresyl and orthochlorophenyl groups, the steps which consist in reacting a phosphorus oxyhalide with a mixture of the isomeric cresols to form corresponding cresyl phosphoric acid halides, and thereafter reacting the latter with orthochlorophenol.

9. In a method of making orthocresyl-di-orthochlorophenyl phosphate, the steps which consist in heating phosphorus oxychloride to a reaction temperature with approximately its molecular equivalent of orthocresol to form orthocresyl phosphoric acid dichloride, and thereafter heating the latter to a reaction temperature with sufficient orthochlorophenol to form the desired mixed triaryl phosphate product.

10. In a method of making di-orthocresyl-orthochlorophenyl phosphate, the step which consists in heating orthochlorophenyl phosphoric acid dichloride to a reaction temperature with sufficient orthocresol to form the desired mixed triaryl phosphate product.

11. In a method of making a cresyl-di-orthochlorophenyl phosphate product, the step which consists in heating a mixture of meta and para cresyl phosphoric acid dichlorides to a reaction temperature with sufficient orthochlorophenol to form the desired mixed triaryl phosphate.

12. A triaryl phosphate having the general formula

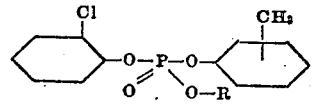

wherein R represents a member of the class consisting of the cresyl and orthochlorophenyl groups.

13. Orthocresyl-di-orthochlorophenyl phosphate, a viscous liquid boiling at approximately 270° C. at 15 millimeters pressure, having the specific gravity 1.336 at 25°/4° C., and having the formula

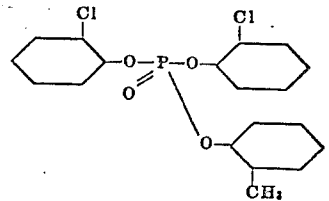

14. Di-orthocresyl-orthochlorophenyl phosphate, a viscous liquid boiling at approximately 273° C. at 7 millimeters pressure, having the specific gravity 1.262 at 25°/4° C., and having the formula

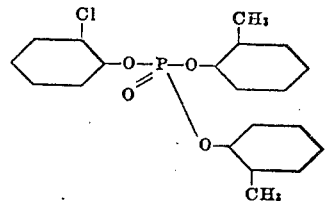

15. A liquid mixture of metacresyl-di-orthochlorophenyl phosphate and paracresyl-di-orthochlorophenyl phosphate, boiling at approximately 293°–298° C. at 9 millimeters pressure, and having the specific gravity 1.308 at 25°/25° C.

SHAILER L. BASS.